United States Patent [19]

Fukami et al.

[11] Patent Number: 4,494,597
[45] Date of Patent: Jan. 22, 1985

[54] VENTILATING DEVICE FOR AUTOMOTIVE VEHICLE

[75] Inventors: Akira Fukami; Kunio Okamoto, both of Okazaki; Hiroki Noguchi, Oobu, all of Japan

[73] Assignee: Nippon Soken, Inc., Nishio, Japan

[21] Appl. No.: 317,408

[22] Filed: Nov. 2, 1981

[30] Foreign Application Priority Data

Nov. 5, 1980 [JP] Japan .................. 55-154904
Mar. 10, 1981 [JP] Japan .................. 56-33012[U]

[51] Int. Cl.³ ........................... F28F 27/00
[52] U.S. Cl. ........................ 165/41; 165/54; 165/DIG. 12; 98/2; 98/2.11
[58] Field of Search ............ 62/244, 239; 165/41, 165/42, 66, 54, DIG. 12, 16; 237/12.3 A; 98/2, 2.01, 2.11

[56] References Cited

U.S. PATENT DOCUMENTS

| 2,714,808 | 8/1955 | Owen et al. | 62/244 |
| 2,743,589 | 5/1956 | Kuempel | 62/244 |
| 2,779,162 | 1/1957 | Baker et al. | 62/244 |
| 2,779,164 | 1/1957 | Doane | 62/244 |
| 2,970,456 | 2/1961 | Rice | 62/244 |
| 3,394,887 | 7/1968 | Megargle et al. | 237/12.3 A |
| 3,595,029 | 7/1971 | Lende, Jr. | 62/244 |

FOREIGN PATENT DOCUMENTS

| 1131110 | 7/1955 | Fed. Rep. of Germany | 237/12.3 A |
| 2515784 | 2/1976 | Fed. Rep. of Germany | 62/244 |
| 17178 | 5/1973 | Japan | 165/66 |
| 0045047 | 4/1979 | Japan | 98/2.01 |
| 1302561 | 1/1973 | United Kingdom | 165/66 |
| 1528649 | 10/1978 | United Kingdom | 62/244 |

OTHER PUBLICATIONS

"The Lossnay Penetration—Type Total Heat Exchanger", Mitsubishi Electric Engineer, (Japan), No. 38, Dec. 1973.

Primary Examiner—William R. Cline
Assistant Examiner—Randolph A. Smith
Attorney, Agent, or Firm—Cushman, Darby & Cushman

[57] ABSTRACT

A ventilating device for an automotive vehicle mounted in a rear portion of the vehicle comprises an atmospheric air passageway for introducing atmospheric air from the outside of the vehicle into a vehicle compartment, and an internal air passageway provided in a manner to cross the atmospheric air passageway for leading the air in the rear portion of the vehicle compartment to the outside of the vehicle. The atmospheric air passageway is arranged to cause the atmospheric air to be blown from the rear to the front of the vehicle compartment, so as to improve ventilation performance in the rear portion of the compartment. Further, a total heat exchanger is mounted at the crossing portion of the two passageways for effecting exchange of both sensible heat and latent heat between the atmospheric air flowing through the atmospheric air passageway and the air flowing through the internal air passageway.

3 Claims, 13 Drawing Figures

VENTILATING DEVICE FOR AUTOMOTIVE VEHICLE

FIELD OF THE INVENTION

This invention relates to ventilating devices for automotive vehicles, and more particularly it is concerned with a ventilating device provided with a total heat exchanger capable of improving the performance of ventilating the rear seat of an automotive vehicle and at the same time reducing a cooling or heating load.

DESCRIPTION OF THE PRIOR ARTS

An air conditioning system serving concurrently as a ventilating device has hitherto been mounted in an automotive vehicle. In one system known in the art, for example, air is drawn via an outdoor air intake port 1 opening in the front of an automotive vehicle and forcedly circulated by a fan 2 through a compartment in the vehicle, as shown in FIG. 1. A heat exchanger 3 may be mounted in the passage of air to effect air conditioning or ventilating as desired by means of an atmospheric air switching damper or a blow-out port switching damper, not shown. As the air is introduced into the automotive vehicle from the front of the vehicle compartment, the air inside the vehicle compartment is allowed to flow through an opening 4 formed at the inner panel on one side of the body and through a rear pillar to an opening 5 formed in the outer panel. FIG. 2 shows the condition of flow of air currents in the aforesaid ventilating device of the prior art.

FIG. 2 shows the vehicle compartment as viewed from above including a front dashboard 6, a rear board 7, a front seat 8, a back 8a of the front seat 8, a head rest 8b of the front seat 8, a rear seat 9, a back 9a of the rear seat 9 and an air blowout port 10. The arrows indicate the directions in which the air currents flow.

As can be clearly seen in FIG. 2, the air currents show a marked difference in the tendency of flow between the front part and the rear part of the vehicle compartment. More specifically, the air currents flowing in the front part are currents of air that are blown out of the air inlet port into the compartment in the automotive vehicle so that the air currents flow to every nook and cranny of the compartment with subsidiary currents and turbulent currents, enabling ventilation to be smoothly effected. However, in the rear part, the air currents are currents of air that are drawn into the openings 4 and 5, with little or no subsidiary currents and turbulent currents. Owing to the presence of the back 8a and the head rest 8b of the front seat 8, the air currents flow to the rear seat only through the opposite ends and between the front seat 8 as shown. Thus the opposite ends of the rear part of the compartment in the automotive vehicle are well exposed to the air currents but its central portion is free from the air currents. Stated differently, it is apparent that the central portion is a stagnating zone in which no air flow takes place, so that if the passenger smokes the smoke will stagnate in the central portion of the rear seat 9 and the passenger will feel uncomfortable because ventilation is insufficiently effected at this central portion.

To obviate this disadvantage, proposals have been made to form the openings 4 and 5 not only in the vicinity of the rear pillar but also in the central portion of the rear board 7. When this arrangement is incorporated in the ventilating device, ventilation of the central portion of the rear seat 9 can be effected but the air stagnates at the opposite ends of the rear seat 9, and insufficient ventilation is effected. Thus great difficulties have been encountered in attempts to improve ventilation of the rear part of the vehicle compartment. After all, what can be done in the way of improving the ventilation of the rear part of the compartment is to allow air to blow into the vehicle from the front of the vehicle as much as possible so that the air currents will flow more vigorously in the rear part of the compartment. However, there is no guarantee that the rear part of the compartment will be well ventilated if a large volume of air is drawn into the vehicle from the front of the vehicle. Moreover, if a large volume of air is drawn into the vehicle when an air conditioning system (cooling and heating system) is in operation, the large volume of air drawn into the space would greatly increase a cooling or heating load as the case may be, with the result that it would be impossible to achieve the cooling or heating effects.

It has hitherto been customary to use, particularly with compact automotive vehicles of high class, a cooling and heating system of improved performance which comprises a cooling section located below the rear board (a portion through which the trunk room can be reached) for introducing thereinto a refrigerant compressed by the cooler compressor section in the engine room, and a signal blower for drawing by suction the air in the vehicle compartment and passing same through the cooling section to convert same into a cool air which is delivered to the compartment again. Also, in an attempt to clean the air in the vehicle compartment by removing tobacco smoke and offensive odor, proposals have been made to provide upstream of the cooling section a filter comprising activated carbon, etc. The use of this type of air cleaner which utilizes the property of the activated carbon to adsorb foreign matter has become popular.

However, the aforesaid systems of the prior art are still unable to satisfactorily solve the problem of cleaning the vehicle compartment, by removing tobacco smoke of a large volume or odor. The odor adsorbed by activated carbon would be released therefrom when the air to be treated is clean, thereby releasing odor into the clean air. The problem with regard to odor could be solved if air were introduced from the atmosphere in the same manner as air is introduced into the cooler unit in the front of the automotive vehicle. However, this would give rise to the problem of increasing a cooling load of the vehicle because air of high temperature is introduced into the vehicle from the atmosphere when cooling is effected by the cooling and heating system.

SUMMARY OF THE INVENTION

This invention has as its object the provision of a ventilating device for an automotive vehicle, obviating the aforesaid disadvantages of the prior art, which is capable of effecting ventilation of the automotive vehicle compartment without increasing a cooling or heating load.

In one aspect of the invention, there is provided a ventilating device for an automotive vehicle mounted in a rear portion of the vehicle for effecting ventilation between an air in a vehicle compartment and an atmospheric air outside the vehicle, comprising an atmospheric air passageway for drawing the atmospheric air from the outside of the vehicle and blowing the same from the rear portion of the vehicle compartment toward the front portion thereof, an internal air passageway provided in a manner to cross the atmospheric air passageway for leading the air in the rear portion of the vehicle compartment to the outside of the vehicle, and a total heat exchanger mounted at the crossing portion of the atmospheric air passageway and the internal air passageway for causing both sensible heat and latent heat to be exchanged between the atmospheric air flowing through the atmospheric air passageway and the air flowing through the internal air passageway.

In another aspect of the invention, there is provided a rear seat air conditioning and ventilating device mounted below a rear board of an automotive vehicle in which a vehicle compartment is separated from a trunk room by the rear board, comprising:

a blower for introducing atmospheric air into the vehicle compartment;

an atmospheric air passageway for allowing the atmospheric air drawn by the blower to flow therethrough;

an internal air passageway for leading the air in the vehicle compartment to the outside of the vehicle via the trunk room;

an air conditioner mounted in the atmospheric air passageway for effecting air conditioning:

a total heat exchanger mounted at the crossing portion of the atmospheric air passageway and the internal air passageway for causing both sensible heat and latent heat to be exchanged between the atmospheric air flowing through the atmospheric air passageway and the air flowing through the internal air passageway;

a casing housing the total heat exchanger and defining therein an internal air inlet portion, an internal air outlet portion, an atmospheric air inlet portion and an atmospheric air outlet portion;

the total heat exchanger having a surface which faces the internal air inlet portion and is inclined by 15° to 30° with respect to the rear board, and another surface which faces the internal air outlet portion and opens to the trunk room; and a switch damper mounted on the casing for selectively communicating the atmospheric air inlet portion with either the internal air inlet portion or the atmospheric air passageway.

Additional and other objects, features and advantages of the invention will become apparent from the description set forth hereinafter by referring to FIGS. 3 to 13.

DESCRIPTION OF THE PREFERRED EMBODIMENTS

Figure 1:
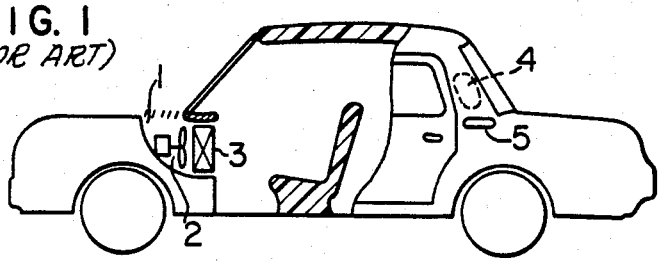
FIG. 1 is a model view showing a ventilating device of the prior art mounted in an automotive vehicle.
Figure 2:
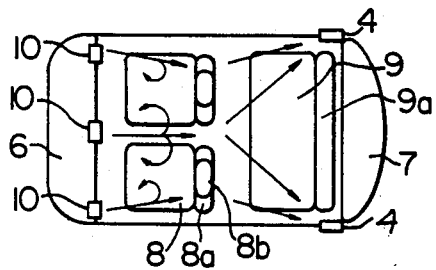
FIG. 2 is a schematic view in explanation of the condition of flow of air currents in an automotive vehicle provided with a ventilating device of the prior art.
Figure 3:
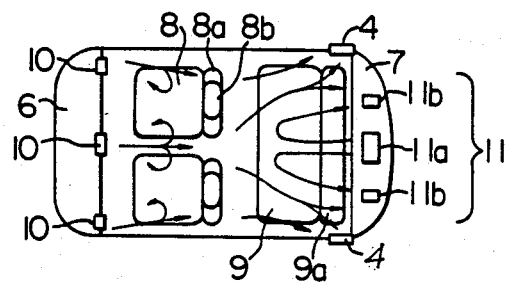
FIG. 3 is a schematic view in explanation of the condition of flow of air currents in an automotive vehicle provided with the ventilating device according to an embodiment of the invention.
Figure 4:
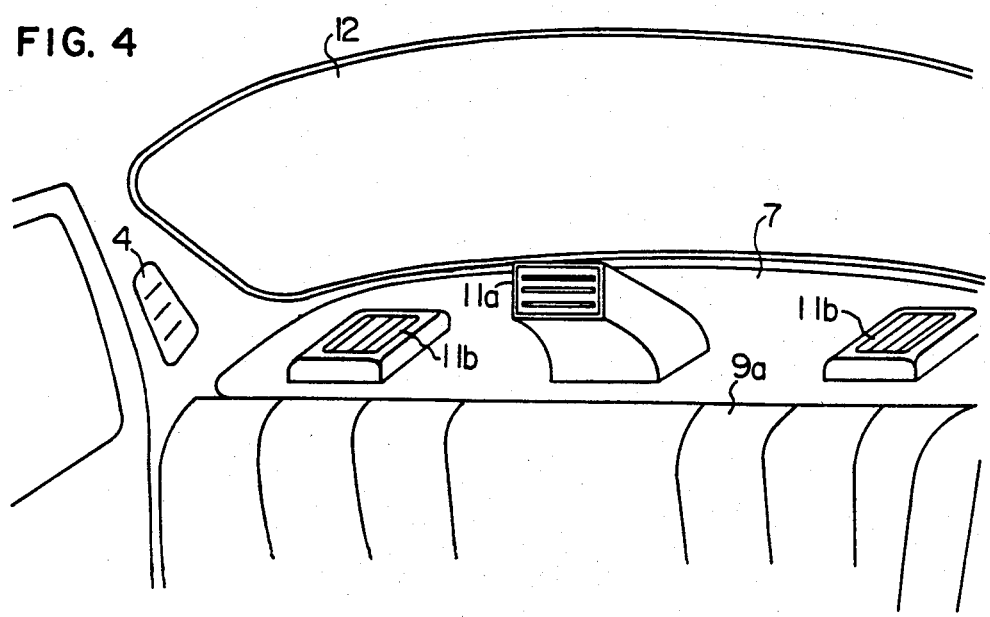
FIG. 4 is a fragmentary perspective view of an automotive vehicle showing the air blowing port of the ventilating device shown in FIG. 3.
Figure 5:
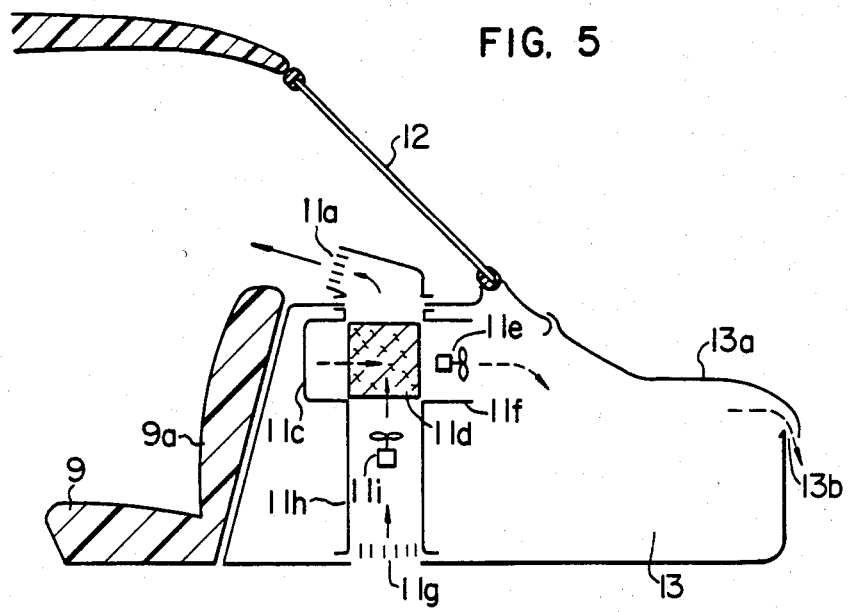
FIG. 5 is a schematic view showing in vertical cross section the ventilating device shown in FIG. 3.
Figure 6:
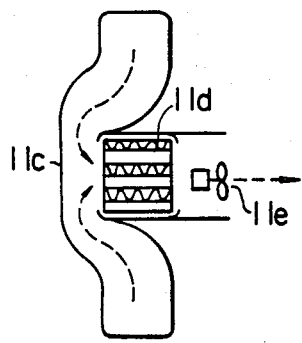
FIG. 6 is a transverse sectional view of the ventilating device shown in FIG. 3.

FIGS. 3-8 shows an embodiment of the invention. FIG. 3 shows a compartment in an automotive vehicle in its entirety, wherein numeral 11 designates a ventilating device mounted on a rear board 7 in a rear portion of the vehicle. FIG. 4 shows the ventilating device 11 as viewed from inside the vehicle compartment, and numerals 12, 11a and 11b designate a rear window, an atmospheric air blowing port and an internal air drawing port respectively. FIG. 5 is a vertical sectional view of the rear portion of the automotive vehicle, and numerals 13, and 13a designate a trunk room and a door of the trunk room respectively. The trunk room 13 is constructed such that even if the door 13a thereof is closed, a ventilating port 13b in the rear portion of the trunk room 13 opens to the atmosphere. The ventilating device 11 is constructed as shown in FIGS. 5 and 6, in which numerals 11c, 11d, 11e, 11f, 11g, 11h and 11i designate an internal air passageway, a total heat exchanger, an internal fan and motor, an opening of the internal air passageway in the trunk, an atmospheric air inlet port, an atmospheric air passageway, and an atmospheric air fan and motor, respectively. Arrows in broken lines indicate the flow of internal air currents.

Figure 8:
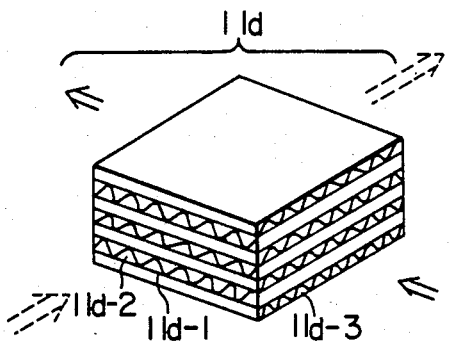
FIG. 8 is a perspective view of the total heat exchanger shown in FIG. 5.
Figure 7:
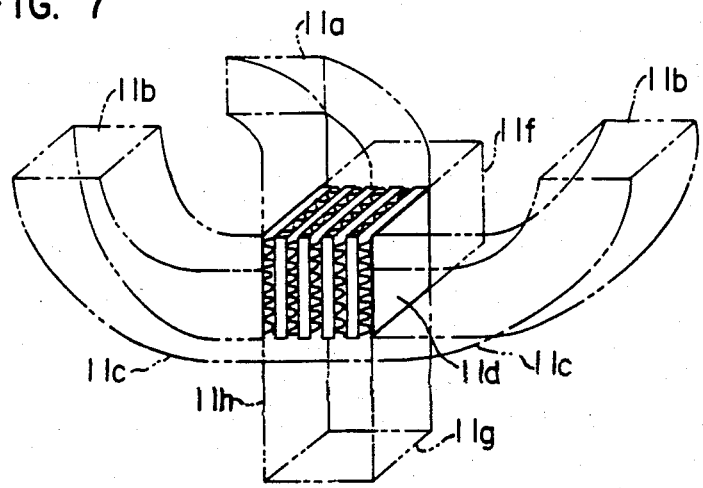
FIG. 7 is a perspective view showing the arrangement of ducts in the ventilating device shown in FIG. 3.
Figure 9:
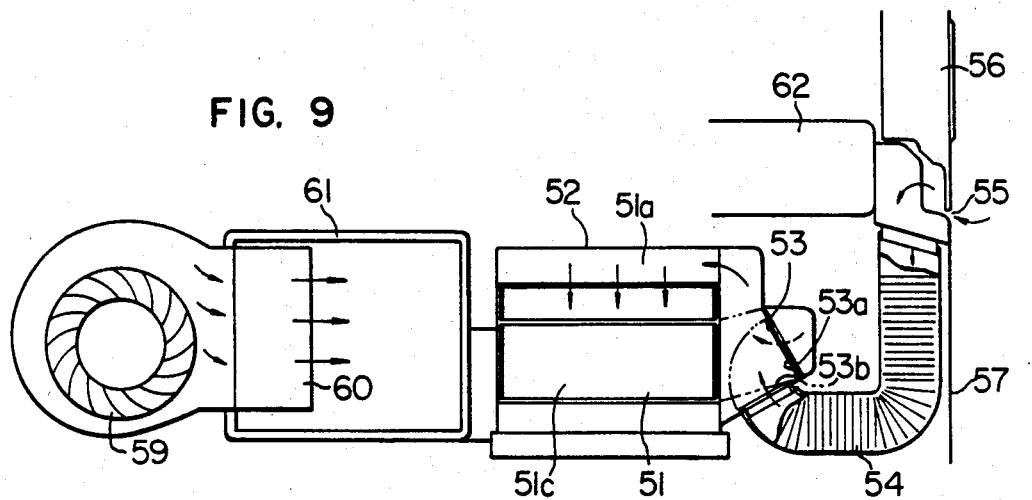
FIG. 9 is a sectional plan view showing the ventilating device according to another embodiment of the invention, as viewed from above the automotive vehicle.
Figure 10:
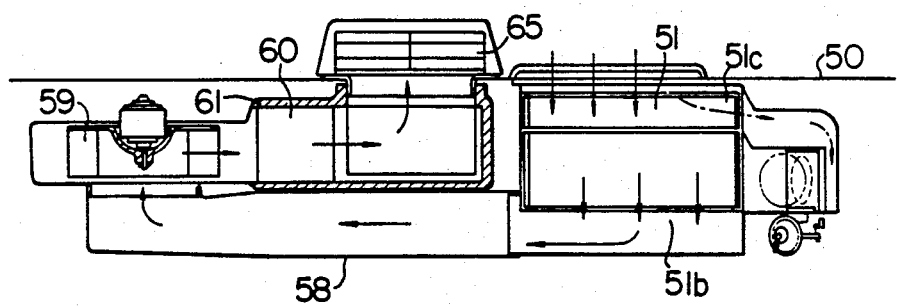
FIG. 10 is a sectional front view of the ventilating device shown in FIG. 9, as viewed from the rear of the automotive vehicle.
Figure 11:
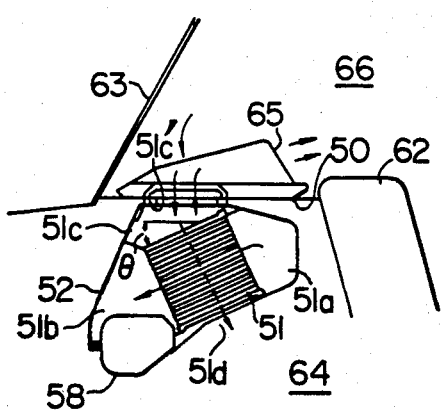
FIG. 11 is a sectional side view of the ventilating device shown in FIG. 9.
Figure 12:
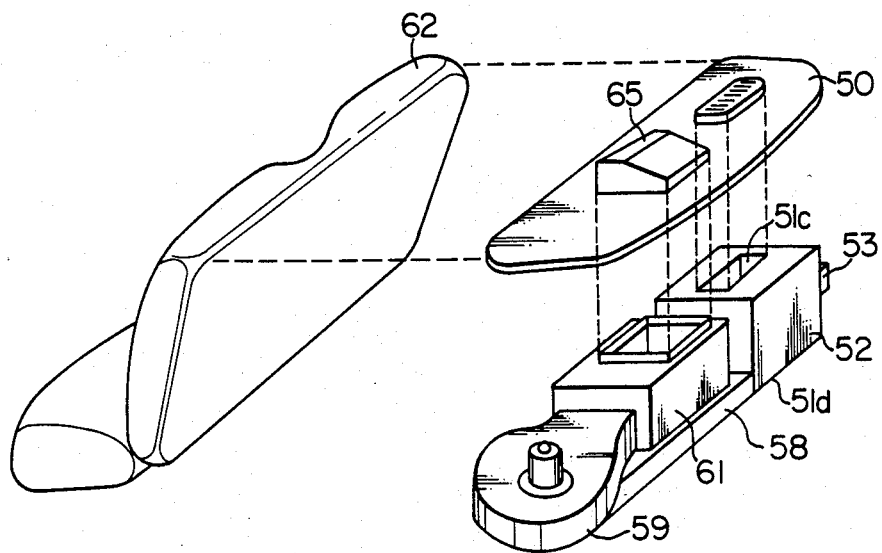
FIG. 12 is a perspective view of the ventilating device shown in FIG. 9.

FIG. 7 is a perspective view showing ducts of the ventilating device 11 centering at the total heat exchanger 11d. The total heat exchanger 11d is an air-to-air heat exchanger capable of simultaneously effecting exchange of both sensible heat (temperature) and latent heat (humidity). As shown in FIG. 8, the total heat exchanger 11d comprises a plurality of planar partition plates 11d-1 formed of Japanese paper, and a plurality of corrugated spacing plates 11d-2 and 11d-3 superposed one over another with the spacing plates 11d-2 and 11d-3 being arranged in a manner to have their corrugations located at right angles to each other. By this arrangement, the atmospheric air and the internal air passing through the total heat exchanger 11d flow in currents crossing each other at right angles, to enable sensible heat and latent heat to be exchanged through the partition plates 11d-1.

Operation of the device constructed as aforesaid will be described. Let us assume that the season is summer. The internal air of the vehicle compartment drawn via the internal air drawing port 11b flows through the internal air passageway 11c into the total heat exchanger 11d, and delivered by the fan 11e to the trunk room 13 after passing through the total heat exchanger 11d. The atmospheric air drawn via the atmospheric air inlet port 11g is passed by the fan 11i to the total heat exchanger 11d and blown into the vehicle compartment via the atmospheric air blowing port 11a after passing through the total heat exchanger 11d. In passing through the total heat exchanger 11d, exchange of heat takes place between the atmospheric air of high temperature and high humidity and the internal air of low temperature and low humidity, so that the atmospheric air has its temperature and humidity reduced when supplied to the vehicle compartment. The air currents blown into the vehicle compartment impinge on the air currents flowing from the front seat as shown in FIG. 3, and are vented to the atmosphere through openings 4 and 5 with a high degree of turbulence.

As can be clearly seen in FIG. 3, the rear seat of the vehicle is exposed to the air currents in every nook and corner thereof, so that ventilation is satisfactorily effected therein. By providing the atmospheric air blowing port 11a in the central portion of the rear board 7, it is possible to efficiently carry out ventilation of the rear seat with a small volume of atmospheric air from the front of the vehicle and a small volume of air from the atmospheric air blowing port 11a in the rear of the vehicle. Moreover, the atmospheric air introduced via the ventilation device at the rear of the vehicle has its temperature and humidity reduced by heat exchange with the internal air that is vented to the atmosphere, so that it is negligible as a thermal load and places no large burden on the air conditioning system as a cooling load.

The system operates in the same manner as described hereinabove in the wintertime. The atmospheric air of low temperature and low humidity has its temperature and humidity increased when passing through the total heat exchanger 11d before being supplied to the vehicle compartment, so that ventilation can be carried out efficiently with a very low heating load.

The fans 11e and 11i are located as shown in FIG. 5 with respect to the total heat exchanger 11d. However, the invention is not limited to this position of the fans 11e and 11i and that the fans 11e and 11i may be either upstream of or downstream of the total heat exchanger 11d with respect to the direction of flow of the air currents.

One advantage offered by the ventilating device of the aforesaid construction is that an inordinate rise in the temperature in the trunk room can be prevented in summer. More specifically, in automotive vehicles of the prior art, the interior of the trunk room has been closed with respect to the atmospheric air and the internal air in the compartment in the vehicle, so that it has been customary in summer that heat is accumulated in the trunk room 13 while the vehicle trunk or remains stationary under the glaring sun and the temperature therein has risen to 50°-70° C. Thus it has hitherto been impossible to store vegetables, foodstuffs and other perishable goods in the trunk room 13 over a prolonged period of time in summer. In the embodiment of the invention shown and described hereinabove, the trunk room 13 constitutes a part of the internal air passageway 11c so that the internal air is vented to the atmosphere through the trunk room 13 after passing through the total heat exchanger 11d, with the result that the interior of the trunk room 13 is cooled although the temperature therein is only slightly lower than that of the atmosphere. This enables foodstuffs and other perishable goods to be stored in the trunk room 13 without any trouble.

In the embodiment shown and described hereinabove, the partition plates 11d-1 have been described as being formed of Japanese paper. However, the invention is not limited to this specific material for forming the partition plates 11d-1 and the total heat exchanger 11d may be formed of activated carbon paper. Activated carbon paper can be produced readily as follows. Carbon fibers are activated into activated carbon fibers which are then mixed with fibrous polyvinyl alcohol and processed into paper form in the same manner as Japanese paper is made.

Since activated carbon paper is essentially solid carbon, it has higher thermal conductivity than cellulose base organic material, such as Japanese paper. Moreover, since activated carbon paper has a large surface area, it has high heat exchange efficiency, and exchange of moisture takes place more readily than in Japanese paper due to a moisture permeating phenomenon or the molecular dispersion of water vapor and a capillary action of the fine fibers of the activated carbon paper. The activated carbon paper is after all higher in heat exchange efficiency than the Japanese paper, so that it is possible to obtain an overall compact size in a total heat exchanger. Besides, the adsorbing action of the activated carbon enables removal of odor to be effected when the atmospheric air has bad smell. At the same time, removal of noxious gas, such as carbon monoxide, can be effected.

To improve the odor and noxious gas removing function of the total heat exchanger, the atmospheric air side spacing plates 11d-3 may be advantageously formed of activated carbon paper. The use of activated carbon paper for forming the spacing plates (atmospheric air side 11d-3 and internal air side 11d-2) increases the surface area and improves the thermal transfer, thereby further improving heat exchange efficiency. Also, there is the virtue that all the components can be formed of a single material (activated carbon paper).

In normal condition, the activated carbon paper is ignited with difficulty and provides greater safety than the Japanese paper.

As described hereinabove, in the first embodiment of the invention, the atmospheric air is blown from the rear part of the vehicle compartment toward the front part thereof, so that stagnation of air currents in the rear part of the compartment can be avoided and good ventilation of the compartment can be effected. In carrying out ventilation, heat exchange takes place between the atmospheric air and the internal air with respect to both sensible heat and latent heat. Thus no cooling (or heating) load is increased as ventilation is carried out, so that air conditioning can be effected in good condition in the vehicle compartment.

FIGS. 9-13 show a second embodiment of the invention which is in the form of a ventilating air conditioning system enabling cooling and ventilation to be simultaneously carried out. As shown, numeral 51 designates a total heat exchanger secured in a casing 52 which is located below a rear board 50 and constructed to have four closed spaces or an atmospheric air inlet portion 51a, an atmospheric air outlet portion 51b, an internal air inlet portion 51c and an internal air outlet portion 51d with respect to the total heat exchanger 51. The atmospheric air inlet portion 51a is communicated with a damper 53 for switching the exchanger 51 between an internal air circulation mode 53b and an atmospheric air circulation mode 53a. The switching damper 53 is communicated with an atmospheric air passageway 54 which in turn is communicated with an atmospheric air inlet port 55 formed between a rear seat door 56 and a body 57. The atmospheric air passageway 54 is closed when the switching damper 53 is connected to the internal air circulation mode 53b. Meanwhile the atmospheric air outlet portion 51b is communicated with an atmospheric air passageway 58 in which a blower 59 is mounted. A cooling section 60, a casing 61 including a suction port in the vehicle compartment and the blower 59 are of known construction. In the drawings, 62 and 63 designate a rear seat and a rear window glass, respectively.

The internal air inlet portion 51c is communicated with the internal air outlet portion 51d via the total heat exchanger 51. The internal air outlet portion 51d is in a trunk room 64 which is open to the atmosphere. Meanwhile the internal air inlet portion 51c is communicated with the atmospheric air inlet portion 51a when the switching damper 53 is in the internal air circulation mode 53b.

The second embodiment of the invention of the aforesaid construction possesses the following features. As can be clearly seen in FIG. 11, a surface of the total heat exchanger 51 facing the internal air inlet portion 51c is inclined by about 15°–30° with respect to the rear board 50 (25° in the second embodiment), so that an internal air intake portion 51c', the internal air inlet portion 51c and the casing 52 can have their sizes reduced.

When there is no angle of inclination θ or the angle of inclination θ is less than 15°, it would be necessary to increase the dimension of the internal air intake portion 51c' (of the same length as one side of the total heat exchanger 51) to enable the internal air currents to be introduced uniformly into the total heat exchanger 51. Conversely, when the angle of inclination θ is over 30°, the internal air inlet portion 51c would become larger than is necessary in dimension and the casing 52 would become too large vertically in FIG. 12. That is, the internal air outlet portion 51d would come to a downwardly displaced position and the casing 52 would extend into the trunk room 64.

The second feature is that the internal air outlet portion 51d of the total heat exchanger 51 directly opens in the trunk room 64. This enables an overall compact size to be obtained in a casing 52. Thus the internal air flows through a passage that passes through the vehicle compartment, total heat exchanger 51, internal air outlet portion 51d, trunk room 64 and atmosphere. By virtue of the aforesaid two features, the system according to the second embodiment of the invention can be reduced in size and positively mounted below the rear board of the vehicle.

The third feature is that the switching damper 53 is mounted as a unit with the casing 52. By constructing the damper 53 in such a manner that it is capable of effecting selection between communicating the atmospheric air inlet portion 51a with the atmospheric air inlet duct 54 and communicating the atmospheric air inlet portion 51a with the internal air inlet portion 51c, switching between the circulation of internal air and the introduction of atmospheric air can be readily effected as by means of a valve-driven means. Since the damper 53 is unitary with the casing 52, no large space is required for mounting same.

Figure 13:
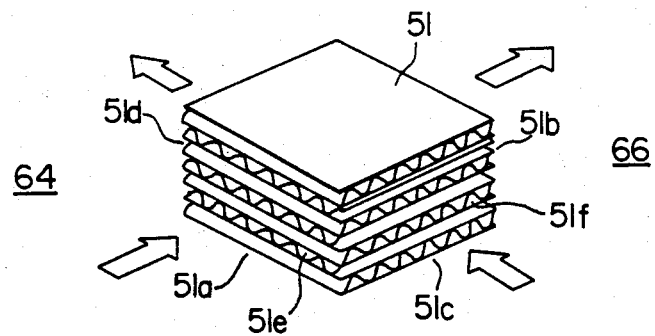
FIG. 13 is a perspective view of the total heat exchanger shown in FIG. 9.

Operation of the system of the aforesaid construction will now be described. First of all, let us discuss the operation in which the damper 53 is in the atmospheric air introducing mode 53a. The air introduced through the atmospheric air inlet port 55, which is fresh but high in temperature and humidity, passes through the atmospheric air passageway 54 and enters the total heat exchanger 51 via the atmospheric air inlet portion 51a and reaches the atmospheric air outlet portion 51b. Meanwhile the air in the vehicle compartment which is foul but low in temperature and relatively low in humidity, passes through the total heat exchanger 51 via the internal air inlet portion 51c and reaches the internal air outlet portion 51d. As shown in FIG. 13, the total heat exchanger 51 has an atmospheric air passage 51e and an internal air passage 51f formed independently of and separately from each other to avoid mixing of the atmospheric air with the internal air. The total heat exchanger 51 having the partition walls formed of paper-like fibers allows the atmospheric air and the internal air to exchange heat and moisture therebetween. That is, the atmospheric air which is high in temperature and humidity though fresh is deprived of heat and moisture by the internal air which is low in temperature and humidity, so that it changes into air of relatively low temperature and low humidity which is drawn by suction by the blower 59 and fed into the vehicle compartment 66 through a blowing port 65 after being cooled in a cooling section 60.

At this time, the foul air in the compartment 66 is forced into an exhaust port or the internal air inlet portion 51c by the internal pressure of the compartment 66 that has been raised by the fresh air fed thereinto. After being subjected to total heat exchange, the internal air is exhausted through the internal air outlet portion 51d and the trunk room 64, to be vented to the atmosphere.

In the second embodiment of the invention, the fresh atmospheric air is supplied to the compartment 66 in the vehicle as air of low temperature and low humidity, so that is is possible to greatly reduce the capacity of the cooling section 60 or a cooling load applied to the system, while enabling fresh air to be supplied to the vehicle compartment 66.

Meanwhile when the atmospheric air has offensive odor as the compartment 66 in the vehicle is suddenly cooled, the atmospheric air passageway 54 can be closed and the internal air can be introduced into the atmospheric air inlet portion 51a if the switching damper 53 is connected to the internal air circulation mode 53b. As a result, the air of low temperature and low humidity passes through the cooling section to be suddenly cooled. At this time, the absence of the atmospheric air being introduced avoids a rise in the internal pressure of the compartment 66 in the vehicle, so that almost no internal air flows through the total heat exchanger from the internal air inlet portion 51c.

Also, by forming the total heat exchanger 51 of paper comprising activated carbon fibers, it is possible to remove offensive odor that might prevail when the internal air is circulated as aforesaid. In addition, even if the exhaust gases of the vehicle are drawn by suction when the atmospheric air is introduced, it is possible to supply fresh air at all times to the vehicle compartment 66 because noxious components of the exhaust gases can be adsorbed on the activated carbon fibers.

From the foregoing description, it will be appreciated that in the second embodiment of the invention, the total heat exchanger is mounted on the upstream side of the cooling section of the cooling system in the rear seat, and the blower is mounted in the atmospheric air passageway for introducing fresh atmospheric air into the vehicle compartment while exhausting to outside the foul air in the compartment by a rise in the internal pressure of the compartment caused by the introduction of the atmospheric air. The internal air and the atmospheric air are caused to exchange heat and moisture with each other at the total heat exchanger, to markedly reduce a thermal load applied to the air conditioning system as compared with direct introduction of atmospheric air.

Particularly, in the second embodiment, no more space than is necessary is required for installing the total heat exchanger which is compact in size and can readily be mounted below the rear board of the vehicle. The air cleaner that has hitherto been mounted as a part of the rear seat cooling system of an automotive vehicle can be done without because its role has been replaced by ventilation, making it possible to make use of the space hitherto occupied by the air cleaner. Further, by this arrangement, great improvements can be provided to the flow of air currents in the rear seat of an automotive vehicle where ventilation has not been effected satisfactorily. The use of activated carbon fibers in the form of paper-like material enables offensive odor to be removed when the rear seat air conditioning system is operated with internal air, thereby eliminating the need to use an air cleaner.

What is claimed is:

1. A ventilating system for an automotive vehicle which includes a trunk compartment, separated from the vehicle compartment by rear seats and a rear board and an air conditioning device mounted in a front portion of the vehicle, said system including a ventilating device mounted in a rear portion of the vehicle below said rear board for effecting ventilation between the air in a vehicle compartment and the atmospheric air outside the vehicle, atmospheric air passageway means for conducting atmospheric air from outside of said vehicle to said ventilation device and into the rear portion of said vehicle compartment so that such air is directed toward the front portion thereof; said atmospheric air passageway means including an outlet port located substantially at the center of the rear board as viewed in the lateral direction of the vehicle and opened toward the front portion of the vehicle;

internal air passageway means provided in a manner to cross atmospheric air passageway means for conducting air in the rear portion of said vehicle compartment out of said vehicle compartment and into said trunk compartment and means for exhausting such air thereafter to the outside of said vehicle, said internal air passageway means including an inlet port located at both lateral end portions of the rear board; and heat exchanger means mounted at the crossing portion of said atmospheric air passageway means and said internal air passageway means for causing both sensible heat and latent heat to be exchanged between the atmospheric air flowing through said atmospheric air passageway means and the air flowing through said internal air passageway means.

2. In an automotive vehicle which includes a vehicle compartment and a trunk area separated from each other by a rear board, an air conditioning device mounted in a front portion of said vehicle, and a rear seat air conditioning and ventilating device mounted below said rear board of said vehicle, said rear seat air conditioning and ventilating device comprising:

a blower for introducing atmospheric air into said vehicle compartment;

atmospheric air passageway means for allowing the atmospheric air drawn by said blower to flow therethrough, said atmospheric air passageway means including an outlet port located substantially at the center of the rear board as viewed in the lateral direction of the vehicle and opened toward the front portion of the vehicle;

internal air passageway means for leading the air in said vehicle compartment to the outside of said vehicle via said trunk area, said internal air passageway means including an inlet port located at one lateral end portion of the rear board;

a rear air conditioner mounted in said atmospheric air passageway for effecting air conditioning;

a total heat exchanger mounted at the crossing portion of said atmospheric air passageway and said internal air passageway for causing both sensible heat and latent heat to be exchanged between the atmospheric air flowing through said atmospheric air passageway and the air flowing through said internal air passageway, said rear air conditioner being positioned downstream from said total heat exchanger;

a casing housing said total heat exchanger and defining therein internal air inlet portion, internal air outlet portion, atmospheric air inlet portion and atmospheric air outlet portion;

said total heat exchanger having a surface which faces said internal air inlet portion and is inclined by 15% to 30% with respect to said rear board, and another surface which faces said internal air outlet portion and opens to said trunk room; and a switch damper mounted on said casing upstream of said total heat exchanger for selectively communicating said atmospheric air inlet portion with either said internal air inlet portion or said atmospheric air passageway.

3. In an automotive vehicle as in claim 2, further including an opening formed in a rear part, adjacent the rear board, of at least one lateral side of the vehicle body for allowing the air in the vehicle compartment to flow therethrough to the outside of the vehicle, said one lateral side of the vehicle body being that lateral side thereof which is remote from said one lateral end portion of the rear board where said internal air inlet port is located.

* * * * *